(12) United States Patent
Stroomer et al.

(10) Patent No.: US 9,325,602 B2
(45) Date of Patent: Apr. 26, 2016

(54) LOW-RISK DEPLOYMENT OF WEB SERVICES

(71) Applicant: Disney Enterprises, Inc., Burbank, CA (US)

(72) Inventors: Jeffrey Stroomer, Lafayette, CO (US); Philip James-Roxby, Longmont, CO (US); Raul Rangel, Golden, CO (US)

(73) Assignee: Disney Enterprises, Inc., Burbank, CA (US)

( * ) Notice: Subject to any disclaimer, the term of this patent is extended or adjusted under 35 U.S.C. 154(b) by 218 days.

(21) Appl. No.: 13/925,693

(22) Filed: Jun. 24, 2013

(65) Prior Publication Data

US 2014/0379897 A1   Dec. 25, 2014

(51) Int. Cl.
*G06F 15/173*   (2006.01)
*H04L 12/26*   (2006.01)

(52) U.S. Cl.
CPC ..................... *H04L 43/50* (2013.01)

(58) Field of Classification Search
CPC ........................................ H04L 43/50
USPC .................................. 709/223, 224
See application file for complete search history.

(56) References Cited

U.S. PATENT DOCUMENTS

2008/0295064 A1* 11/2008 Mitra et al. .................. 717/100

* cited by examiner

*Primary Examiner* — Adnan Mirza
(74) *Attorney, Agent, or Firm* — Farjami & Farjami LLP

(57) ABSTRACT

There are provided systems and methods for providing low-risk deployment of a web service. In one implementation, such a method includes testing the web service on one or more virtual machines assigned to a testing environment of the system, and reassigning the one or virtual machines to a production environment of the system configured to service live traffic for the web service. The method also includes hosting the web service using the same one or more virtual machines used to test the web service.

16 Claims, 3 Drawing Sheets

LOW-RISK DEPLOYMENT OF WEB SERVICES

BACKGROUND

Web services play a key role in facilitating information exchange in network environments, and are relied upon to service network traffic round-the-clock. As a result, deploying a new version of a web service, such as an updated or improved version of the web service, must typically be performed in such a way as to maintain service continuity during the deployment process.

A service cluster hosting a web service will often include a load balanced tier of virtual machines (VMs) on each of which the web service is running concurrently. A conventional approach to deploying a new version of the web service includes testing the new version in a quality assurance (QA) environment, removing a VM from the load balancer rotation, replacing or over-writing the old version of the web service stored on the VM with the new version, and returning the VM having the new version of the web service to the load balancer rotation. That procedure is then typically repeated until all of the VMs running the web service have the new version installed.

The conventional deployment approach described above can be risky, however. For example, because the new version of the web service is typically tested in a QA environment, there remains some uncertainty about how the new web service will perform in production, i.e., on a VM in the load balancer rotation and receiving live traffic. Moreover, in the event of malfunction or failure of the new version of the web service, changes made to VM configuration settings during the deployment may require more than simple restoration of the old version of the web service software. As a result, the process of backing out a failed or underperforming software deployment may be labor intensive and time consuming, and in some instances may place service continuity at risk.

SUMMARY

There are provided systems and methods for providing low-risk deployment of web services, substantially as shown in and/or described in connection with at least one of the figures, and as set forth more completely in the claims.

DETAILED DESCRIPTION

Figure 1:
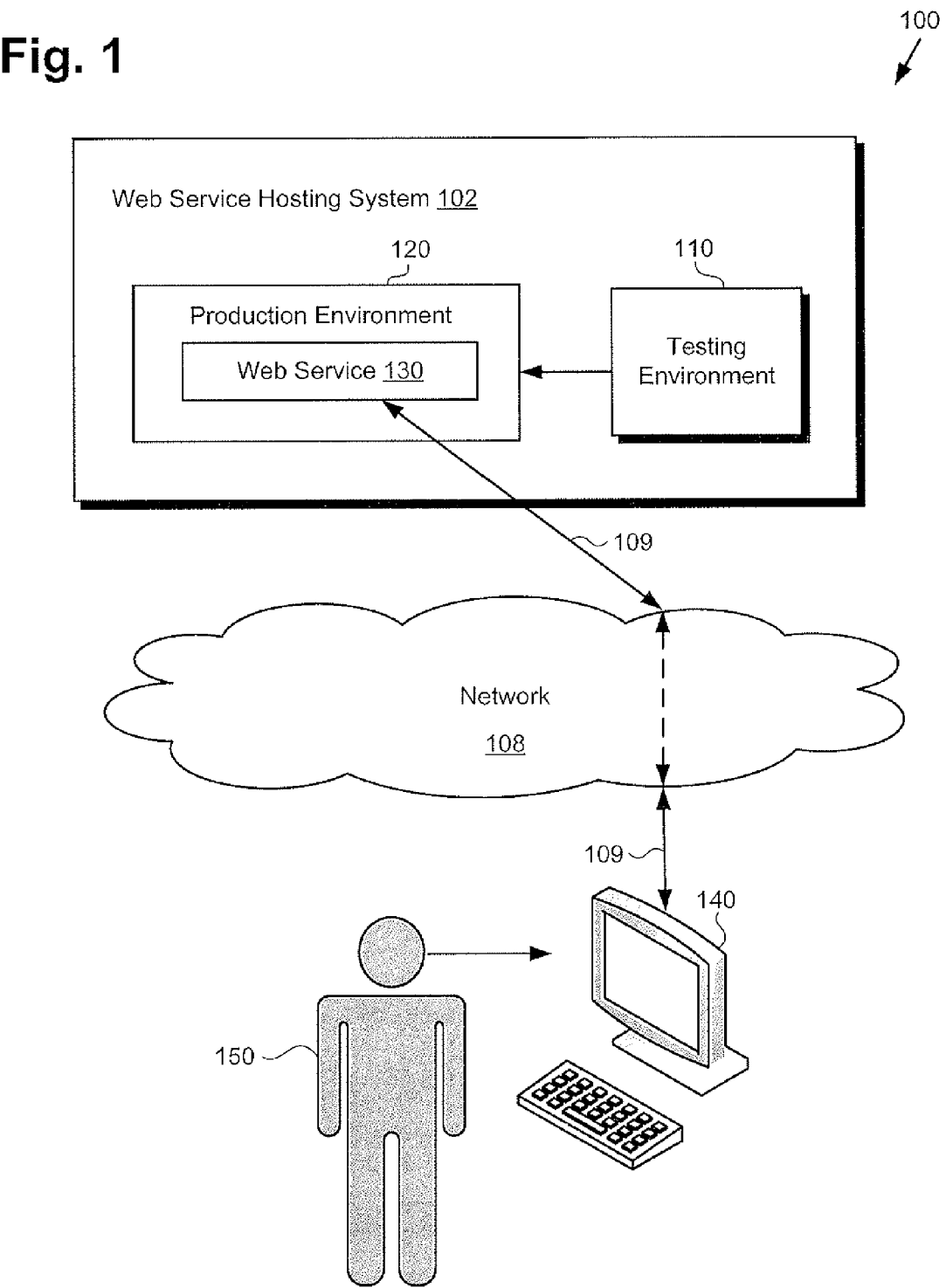
FIG. 1 shows a diagram of a network environment including an exemplary system for providing low-risk deployment of a web service, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As discussed above, web services play a key role in facilitating information exchange in network environments, and are often relied upon to service network traffic round-the-clock. As a result, deployment of a new version of a web service, such as an updated or improved version of the web service, must typically be performed in such a way as to maintain service continuity during the deployment process. A conventional approach to deploying a new version of a web service includes testing the new version in a quality assurance (QA) environment, removing a virtual machine (VM) from a load balanced tier of VMs running the web service, replacing or over-writing the old version of the web service stored on the VM extracted from the tier of VMs with the new version, and returning the VM having the new version of the web service to the load balanced tier. That procedure is then typically repeated until all of the VMs running the web service have the new version installed.

However, and as further discussed above, the conventional approach to web service deployment can be risky. For example, because the new version of the web service is typically tested in a QA environment only, there remains some uncertainty about how the new web service will perform in production, i.e., on a VM in the load balanced tier hosting the web service. Moreover, in the event of malfunction or failure of the new version of the web service, changes made to VM configuration settings during the deployment may require more than simple restoration of the old version of the web service software. As a result, the process of backing out a failed or malfunctioning software deployment in the conventional approach may be labor intensive and time consuming, and in some instances may place service continuity at risk. Thus, a less risky solution for deploying web services is desirable.

It is noted that, as used in the present application, the terms "low-risk" and "risky" refer to the vulnerability of a process to malfunction or failure, as well as to the costs associated with correcting the malfunction or remedying the failure should they occur. Thus, a low-risk process is defined as one having a relatively low likelihood of malfunction or failure, and/or a relatively low cost related to correcting those problems. Conversely, an risky process is defined as one characterized by significant uncertainty with respect to its success or failure, and/or a relatively high cost related to correcting its problems.

FIG. 1 shows a diagram of a network environment including an exemplary system for providing low-risk deployment of a web service, according to one implementation. Network environment 100 includes web service hosting system 102, communications network 108, client system 140, and user 150. As further shown in FIG. 1, web service hosting system 102 includes testing environment 110, and production environment 120 hosting web service 130. Also shown in FIG. 1 is live traffic 109 representing interaction of user 150 and web service 130 over communications network 108. According to the implementation shown in FIG. 1, testing environment 110 may be used for testing of web service 130 prior to its deployment to production environment 120. Production environment 120 is configured to service live traffic 109 for web service 130. It is noted that although FIG. 1 depicts testing environment 110 and production environment 120 as separate environments, that representation is merely provided as an aid to conceptual clarity. In some implementations, testing environment 110 and production environment 120 may be integrated into a shared operational environment. For example, in some implementations, testing environment 110 may be included within production environment 120.

It is also noted that although FIG. 1 appears to depict user 150 and client system 140 as a single user and a single client system, that representation is provided merely for convenience. More generally, user 150 corresponds to a group of users (hereinafter "users 150"), acting independently of one another, and each having access to a client system corresponding to client system 140 (hereinafter "client systems 140"). As a result, live traffic 209 represents the aggregate live traffic generated by users 150 using client systems 140. Moreover, although client systems 140 may include personal computer (PC), as depicted in FIG. 1, that representation is provided merely as an example. Client systems 140 may include other types of mobile or stationary personal communication devices or systems. For example, client systems 140 may take the form of tablet computers, physical media players, such as a Digital Video Disc (DVD) or Blu-ray™ disc players, or Smartphones, digital media players, or gaming consoles.

According to the implementation shown by FIG. 1, users 150 may utilize client systems 140 to access web service 130 provided by production environment 120 of web service hosting system 102. In one such implementation, web service hosting system 102 may correspond to one or more web servers accessible over a packet network, such as the Internet, for example. Web service 130 may be any type of web service encountered in network environment 100. In some implementations, web service 130 may be a voting service for receiving and processing votes from users 150. For example, web service 130 may mediate voting for a favorite television actor or program. In other implementations, web service 130 may mediate distribution or sharing of media content such as messages, images, or video among users 150. For example, web service 130 may be an upload service enabling users 150 to submit images or video that may be processed, evaluated for suitability as shared content, and published for enjoyment by others of users 150.

As will be described in greater detail below, web service hosting system 102 is configured to provide low-risk deployment of web service 130. More specifically, web service hosting system 102 may be configured to utilize testing environment 110 to test web service 130 on one or more VMs assigned to testing environment 110, prior to deployment of web service 130 to production environment 120 (one or more VMs not explicitly shown in FIG. 1). Web service hosting system 102 may also be configured to reassign the VM(s) on which the testing of web service 130 is performed to production environment 120, and to host web service 130 in production environment 120 using the same VM(s) used to test web service 130 in testing environment 110. It is noted that the operations performed by web service hosting system 102 to provide low-risk deployment of web service 130 may be performed using one or more processors and one or more memory resources of web service hosting system 102.

Figure 2:
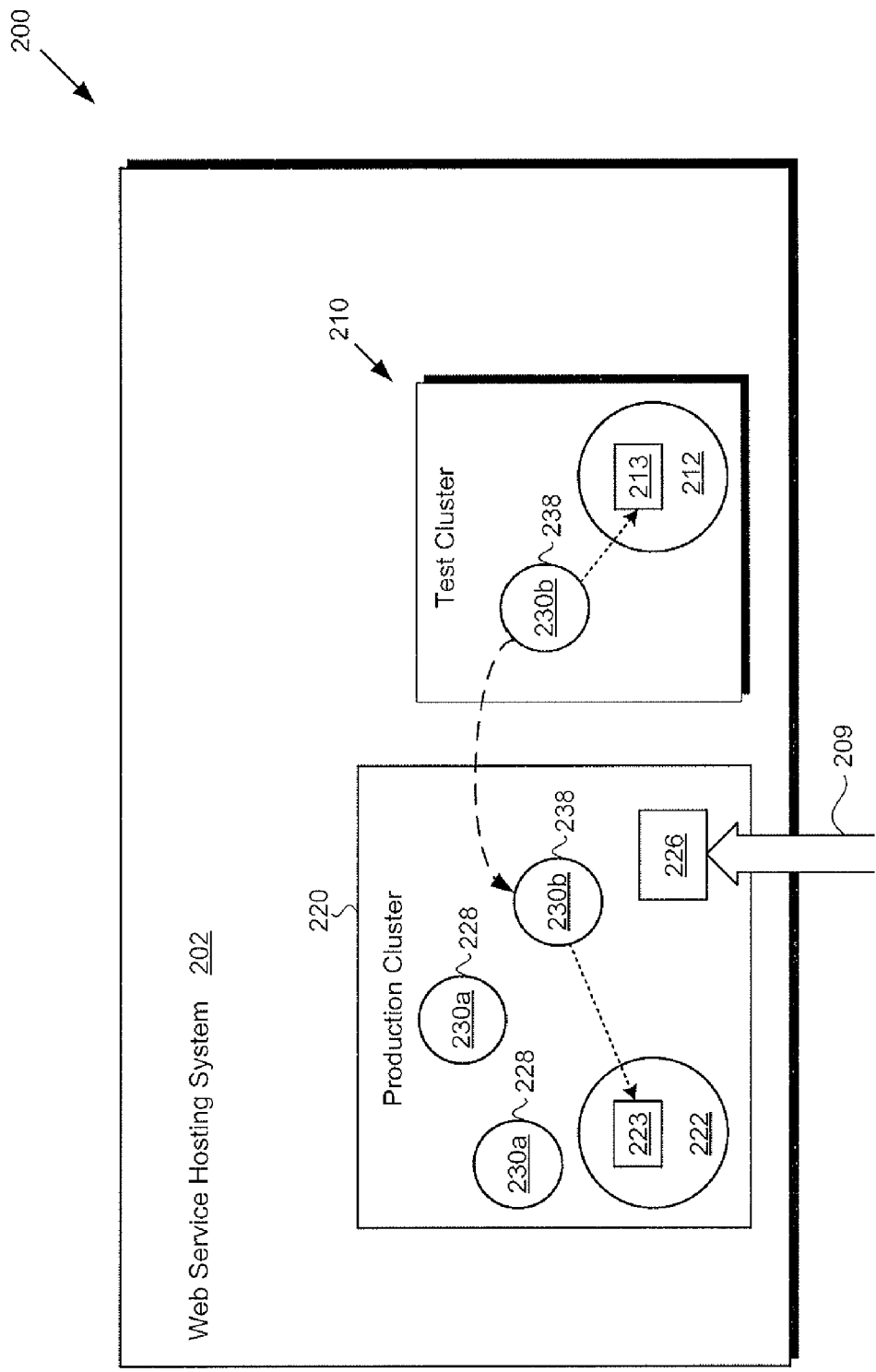
FIG. 2 shows a more detailed view of an exemplary system for providing low-risk deployment of a web service, corresponding in general to the system of FIG. 1.

Referring to FIG. 2, FIG. 2 shows another exemplary implementation of a system configured to provide low-risk deployment of a web service. Network environment 200 includes web service hosting system 202 receiving live traffic 209. Web service hosting system 202 is shown to include test cluster 210 and production cluster 220.

Web service hosting system 202 receiving live traffic 209 corresponds in general to web service hosting system 102 receiving live traffic 109, in FIG. 1. Moreover, test cluster 210 and production cluster 220, in FIG. 2, correspond respectively to testing environment 110 and production environment 120, in FIG. 1, and may share any of the characteristics attributed to those corresponding features, above. For example, although test cluster 210 and production cluster 220 are shown as separate environments within web service hosting system 202, in some implementations test cluster 210 and production cluster 220 may occupy a shared operational environment.

As shown in FIG. 2, test cluster 210 includes test master VM 212 running master service 213 for managing test cluster 210. Test cluster 210 also includes VM 238 on which web service 230b is loaded. Web service 230b corresponds in general to web service 130 in FIG. 1. Specifically, web service 230b corresponds to a newer or updated version of web service 130.

It is noted that although FIG. 2 shows master VM 212 and VM 238 each as a single VM, that representation is merely for convenience. In practice, one or both of master VM 212 and VM 238 may correspond to one or more VMs on which master service 213 and web service 230b, respectively, are loaded. Thus, test cluster 210 typically includes one or more test master VM(s) 212 running master service 213, and at least one, and perhaps more or many more VM(s) 238 on which web service 230b is loaded.

Production cluster 220 includes production master VM 222 running master service 223 for managing production cluster 220. Production cluster 220 also includes VMs 228 providing web service 230a, and traffic routing module 226, which may be implemented as a reverse proxy server, for example, for receiving and redirecting live traffic 209. Like web service 230b, web service 230a corresponds in general to web service 130 in FIG. 1. However, web service 230a corresponds to an older version of web service 130 being hosted by web service hosting system 102/202 prior to deployment of the newer version of web service 130 represented by web service 230b. Moreover, it is noted that although production master VM 222 is depicted as a single VM in FIG. 2 for convenience, more generally production master VM 222 corresponds to one or more VMs configured to run master service 223.

According to one implementation, web service hosting system 202 may be configured to function as a hypervisor or virtual machine monitor (VMM) including one or more processors and memory resources usable to create and run the VMs of test cluster 210 and production cluster 220. Moreover, as used in the present application, the feature "master service" refers to a software application that monitors the VM(s) assigned to a cluster or environment managed by the master service. The master service monitors the identities of VMs assigned to its cluster or environment. Thus, master service 213 monitors the identities of VM(s) assigned to test cluster 210, while master service 223 monitors the identities of VMs assigned to production cluster 220. In addition, in some implementations, master service 223 may include substantially all of the configuration settings for hosting web service versions 230a/230b.

The present inventive concepts will now be further described with reference to FIG. 3, which presents flowchart 300 describing an exemplary method for providing low-risk deployment of a web service. With respect to the method outlined in FIG. 3, it is noted that certain details and features have been left out of flowchart 300 in order not to obscure the discussion of the inventive features in the present application.

Figure 3:
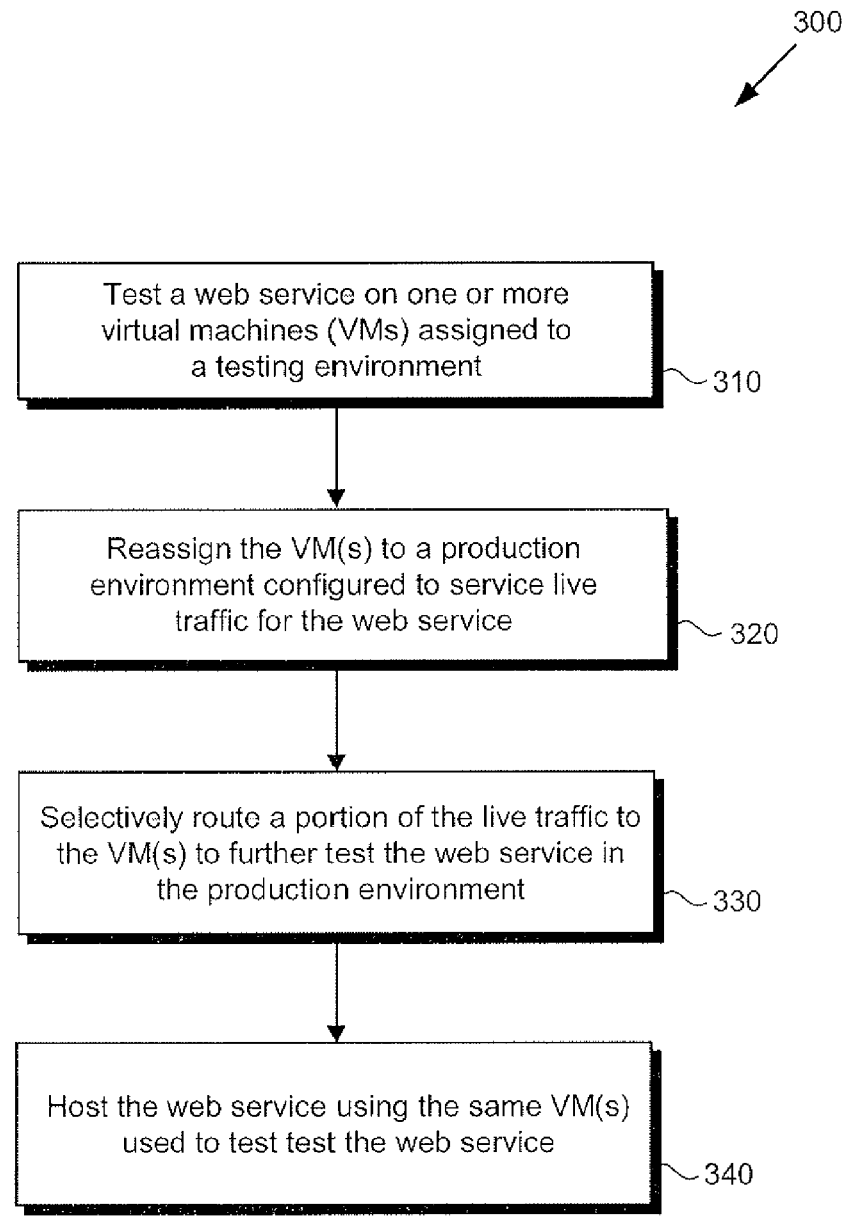
FIG. 3 is a flowchart presenting an exemplary method for use by a system for providing low-risk deployment of a web service.

Referring to FIG. 3, with further reference to FIG. 2, flowchart 300 begins with testing web service 230b on one or more VM(s) 238 assigned to test cluster 210 (310). Testing of web service 230b may be performed by web service hosting system 202, using one or more processors and VM(s) 238 assigned to test cluster 210, preliminary to deploying web service 230b into production cluster 220.

Testing of web service 230b in test cluster 210 may be advantageous because test cluster 210 and production cluster 220 are managed by separate master services, e.g., respective master services 213 and 223. As a result, testing of web service 230b in test cluster 210 enhances safety of a subsequent deployment of web service 230b by allowing for more thorough testing of web service 230b than would typically be performed according to conventional web service deployment solutions. Moreover, this initial testing of web service 230b is a substantially low-risk process because malfunction or failure of web service 230b in test cluster 210 poses no risk to the performance of web service 230a being provided by production cluster 220.

Flowchart 300 continues with reassigning VM(s) 238 to production cluster 220 configured to service live traffic 209 for web service 230a (320). Reassigning of VM(s) 238 to production cluster 220 may be performed by web service hosting system 202, using one or more processors, simply by reassigning VM(s) 238 from master service 213 for managing test duster 210 to master service 223 for managing production cluster 220. This may be accomplished because, in at least one implementation, substantially all configuration settings for hosting web service 230b are available to VM(s) 238 from master service 223 for managing production cluster 220. In some implementations, for example, VM(s) 238 may include an orientation data file in a standard location specifying the particular master service to which VM(s) 238 should look for configuration settings. In those implementations, reassignment of VM(s) 238 may include little more than updating of that orientation data file to identify master service 223 as the source of configuration settings. In some implementations, a restart of VM(s) 238 or the service(s) they host may be required to cause them to read the orientation data file anew, though in general this need not be necessary.

At the present stage of deployment there is still substantially no risk to the performance of web service 230a being provided by production cluster 220. Although VM(s) 238 running web service 230b can now access configuration settings made available by master service 223, VM(s) 238 do not yet receive live traffic from traffic routing module 226. As a result, and also due to the extensive low-risk testing enabled by testing (310) in test cluster 210, VM(s) 238 may be further tested in production cluster 220 prior to receiving any portion of live traffic 209.

It is noted that the safety of the present deployment is further enhanced because the reassignment of VM(s) 238 from test cluster 210 to production cluster 220 is readily reversible. For example, in implementations in which VM(s) 238 include the orientation data file described above, that orientation data file need only be updated once again to reassign VM(s) 238 from master service 223 to master service 213, thereby effectively backing out the deployment of web service 230b.

Flowchart 300 continues with selectively routing a portion of live traffic 209 to VM(s) 238 to further test web service 230b in production cluster 220 (330). Selective routing of live traffic 209 to VM(s) 238 may be performed by web service hosting system 202, using one or more processors and traffic routing module 226 of production cluster 220. As noted above, traffic routing module 226 may be implemented as a reverse proxy server. Routing module 226 may be instructed to route a small portion of live traffic 209 to VM(s) 238 in order to test the performance of web service 230b while receiving live traffic 209.

Again, the present stage of deployment is low-risk because the portion of live traffic routed to VM(s) 238 may initially be quite small. In addition, routing live traffic away from VM(s) 238 in the event of malfunction or failure of web service 230b may be accomplished quickly, for example in approximately one second (1 s), or less. However, the likelihood of malfunction or failure by web service 230b at this stage has been substantially reduced due to previous testing performed in test cluster 210, and further due to additional testing performed in production cluster 220 prior to exposure of VM(s) 238 to any portion of live traffic 209.

Flowchart 300 may conclude with hosting web service 230b using the same VM(s) 238 used to test web service 230b (340). Hosting of web service 230b may be performed by web service hosting system 202, using one or more processors, and may occur after substantially complete deployment of web service 230b into production cluster 220. To provide additional safety in the early phases of hosting of web service 230b, production cluster 220 may include VMs 228 providing older version web service 230a as well as VM(s) 238 providing newer version web service 230b. In some implementations, VMs 228 capable of providing older version web service 230a may receive substantially no live traffic 209 from traffic routing module 226. Once deployment of web service 230a is deemed to have been accomplished safely to a desirable level of confidence, VMs 228 may be advantageously removed from production cluster 220 and/or repurposed.

Thus, from the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for providing low-risk deployment of a web service, the system comprising:
   a testing environment for testing the web service;
   a production environment configured to service live traffic for the web service, wherein the production environment includes a traffic routing module;
   a non-transitory memory storing at least one virtual machine (VM);
   a hardware processor running the at least one VM; and
   the system configured to:
      test the web service using the at least one VM assigned to the testing environment;
      reassign the at least one VM from the testing environment to the production environment;
      receive the live traffic using the traffic routing module;
      selectively redirect a portion of the live traffic, using the traffic routing module, to the at least one virtual machine (VM) reassigned to the production environment;
      test the web service using the at least one VM in the production environment; and
      host the web service using the same at least one VM used to test the web service.

2. The system of claim 1, wherein the production environment comprises a web service production cluster including at least one production master VM running a master service for managing the web service production cluster.

3. The system of claim 2, wherein substantially all configuration settings for hosting the web service are available to the at least one VM from the master service for managing the web service production cluster.

4. The system of claim 2, wherein the testing environment comprises a web service test cluster including at least one test master VM running a master service for managing the web service test cluster.

5. The system of claim 4, wherein the system is configured to reassign the at least one VM to the production environment by reassigning the at least one VM from the master service for managing the web service test cluster to the master service for managing the web service production cluster.

6. The system of claim 1, wherein the traffic routing module comprises a reverse proxy server.

7. The system of claim 1, wherein the web service is a newer version of the web service deployed to replace an older version of the web service hosted by the system.

8. The system of claim 7, wherein the production environment includes at least another VM providing the older version of the web service and the at least one VM used to host the newer version of the web service.

9. A method for use by a system to provide low-risk deployment of a web service, the method comprising:
    testing the web service on at least one virtual machine (VM) assigned to a testing environment of the system;
    reassigning the at least one VM from the testing environment to a production environment of the system configured to service live traffic for the web service, wherein the production environment includes a traffic routing module;
    receiving the live traffic using the traffic routing module;
    selectively redirecting a portion of the live traffic, using the traffic routing module, to the at least one virtual machine (VM) reassigned to the production environment;
    testing the web service by using the at least one VM in the production environment; and
    hosting the web service using the same at least one VM used to test the web service.

10. The method of claim 9, wherein the production environment comprises a web service production cluster including at least one production master VM running a master service for managing the web service production cluster.

11. The method of claim 10, further comprising making substantially all configuration settings for hosting the web service available to the at least one VM from the master service for managing the web service production cluster.

12. The method of claim 10, wherein the testing environment comprises a web service test cluster including at least one test master VM running a master service for managing the web service test cluster.

13. The method of claim 12, wherein reassigning the at least one VM to the production environment comprises reassigning the at least one VM from the master service for managing the web service test cluster to the master service for managing the web service production cluster.

14. The method of claim 9, wherein the traffic routing module comprises a reverse proxy server.

15. The method of claim 9, wherein the web service is a newer version of the web service deployed to replace an older version of the web service hosted by the system.

16. The method of claim 15, wherein the production environment includes at least another VM providing the older version of the web service and the at least one VM used to host the newer version of the web service.

* * * * *